July 16, 1935.  R. F. JACKSON  2,007,971
PROCESS OF MAKING SUGAR PRODUCTS
Original Filed Nov. 29, 1926
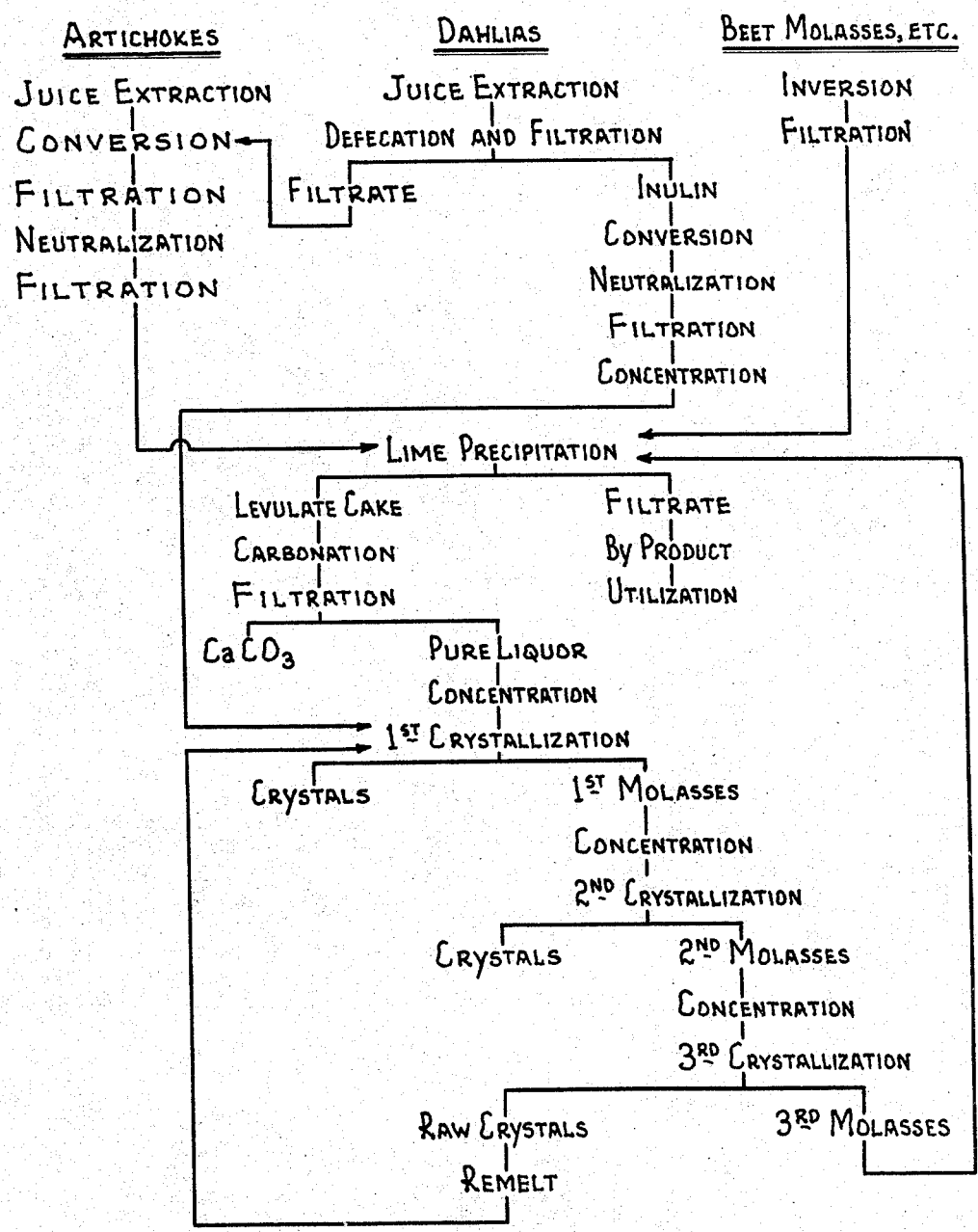
Inventor
RICHARD F. JACKSON.
By Sol Shappirio
Attorney Patented July 16, 1935

2,007,971

UNITED STATES PATENT OFFICE 2,007,971

PROCESS OF MAKING SUGAR PRODUCTS

Richard F. Jackson, Chevy Chase, Md.

Application November 29, 1926, Serial No. 151,609
Renewed September 19, 1932

5 Claims. (Cl. 127—58)

This invention relates to sugars and to processes of producing the same, and more particularly to processes of recovering levulose and its condensation products, and to such products in novel form.

Except in scientific and laboratory work, levulose has been little known and cannot be said to constitute a commercial product in the present state of the art. This condition is largely due to the fact that satisfactory methods of recovering levulose have not heretofore been known and available, the methods used for such purposes involving considerable difficulty and expense, and therefor militating against the possible commercial and industrial exploitation of this sugar and its derivatives. On the other hand, since levulose is considerably sweeter than sucrose, it is desirable to develop its possibilities.

Among the objects and advantages of the present invention are the production of levulose and its condensation products in desirable form or condition for commercial and industrial exploitation; the development of simple and desirable processes for producing these sugars and related products; the utilization of by-products from such processes; and the production of levulose etc. in desirable crystalline form.

Many other and further objects and advantages will appear from the more detailed description set forth below, it being understood however that this more detailed description together with the accompanying flow-sheet, is given by way of illustration, only, and not by way of limitation, since various changes and modifications herein are within the skill of a worker in this art without departing from the spirit and scope of this invention.

In the drawing accompanying this illustrated and more detailed description there is shown a flow-sheet diagram suggestive of the sequence of steps that may be used in carrying this invention into practice.

The invention is primarily concerned with the recovery of levulose in a peculiarly desirable crystalline form from various sources. Among the most desirable sources of the raw materials utilized, there may be mentioned tubers such as the Jerusalem artichoke and dahlia, roots such as chicory, discard molasses from beet-sugar manufacture, etc. These are desirable sources, but any other source may be used, and the indicated sources are merely exemplary. Levulose occurs in plant juices or other analogous products generally in a combined or condensed form, although to a limited extent it also may be found in uncombined form. The condensation products of levulose known as polysaccharides and combinations with other sugars occur widely distributed. Additional sources to those mentioned above are products from the cane or beet sugar industry containing levulose combined with glucose or other sugar, and fruit or vegetable juices which contain levulose in combined or uncombined form.

The nature of the levulose occurring in any particular source may determine the steps to be employed in its recovery, since advantage may be taken of the solubilities of the compounds. This follows from the fact that the levulose derivative in the juices of the tubers etc., occurs almost entirely in the form of polysaccharides of high molecular weight, the nature of which polysaccharides differs in different plants. In some plants, as the Jerusalem artichoke, these polysaccharides remain in solution substantially indefinitely; in others, such as the dahlia, they deposit from solution upon cooling in a substantially insoluble form, in which case they may be readily isolated for further treatment. The presence of other levulose condensation products such as levulins may influence the steps necessary in isolating such materials as inulin.

For the purposes of the present invention the processes utilized may be differentiated into two groups, first, those applicable generally to the levulose containing material regardless of the form in which it is present; and second, special processes applicable to particular forms of condensation products of levulose. The more general processes will be considered first.

These more general processes are particularly applicable to all plant juices containing polysaccharides of levulose. The plant tuber or root is first treated to extract the juice. Any convenient process of crushing and expressing, or of diffusion, may be utilized. Such processes are capable of wide variation and need not be specifically described herein. The juices having been thus obtained are treated to resolve these polysaccharides into their constituent sugars. For convenience this step is hereinafter referred to as "conversion". Conversion is desirably effected by the combined action of elevated temperature and acidity. The temperature and acidity conditions are closely interdependent. While any acid of sufficient strength may be employed, either inorganic or organic, the stronger acids such as sulphuric and hydrochloric acids are to be preferred, principally because of their greater efficiency and cheapness. It has been found that a portion of the added acid is rendered ineffective by the inorganic constituents or buffer substances occurring in the plant juice, so that sufficient acid should be added to overcome this deterring influence, and provide for a residual acidity sufficiently great to catalyze the conversion reaction. Inasmuch as plant juices vary in their content of buffer substances, the amount of such substances present should be estimated, so that a requisite amount of acid may be added. One method that may be used is the determination of the electrical conductivity of the plant juice. For example, it has been found that if a juice has a resistivity at 25° C. of 123 ohms, the addition of such a quantity of sulphuric acid that 9.8 grams will be contained in each liter of the resulting solution, the latter will have a hydrogen ion concentration corresponding substantially with 0.02 normality. The term resistivity as used herein refers to the electrical resistance in ohms of a cube of juice one centimeter on each side. It is not necessary to use dry sulphuric acid, but the calculations are desirably made on the dry basis. If the juice has a lower or higher resistivity a lesser or greater quantity of acid should be used. For example, if the resistivity at 25° C. is 110 ohms, 10.8 grams of acid should be used under the conditions aforesaid; whereas with a resistivity of 140 ohms, 9.3 grams of acid will produce a 0.02 normality with respect to the hydrogen ion. In a solution of 0.02 normality with respect to the hydrogen ion, the polysaccharides in the plant juices are converted into levulose at a rate expressed by the usual unimolecular formula $$k = \frac{1}{t} \log \frac{100}{100-x}$$

in which $k$ is the velocity constant, $t$ the time in minutes, and $x$ the percent of levulose formed during the time $t$. With a knowledge of the respective values of $k$, the time for any given percent of conversion, such as 99%, may be readily calculated. In a solution of 0.02 normality with respect to hydrogen ion, the following were found to be values of $k$:

Centigrade
70.0° _____ 0.0121
72.0° _____ 0.0146
74.0° _____ 0.0176
76.0° _____ 0.0211
78.0° _____ 0.0253
80.0° _____ 0.0303

While a normality 0.02 in hydrogen ion has been referred to above, as particularly desirable, other concentrations may be used. Greater quantities of acid may for example be added. With dibasic acids such as sulphuric acid, it has been found that if added in excess of the quantity required to yield a 0.02 N in hydrogen ion, about one half of the additional hydrogen added, forms hydrogen ion. Further, within the limits of probable applicability of these processes, the velocities will be proportional to the concentrations of hydrogen ion. For this conversion, the preferred range of temperature is from 70 to 80° C. although other temperatures may be used.

During the conversion step, a coagulation or precipitation of a substance or substances rich in nitrogenous material takes place, which may be separated as by filtration, and washed free from acid. This material has a high fertilizer or stock or poultry feed value, and may be utilized for such purposes. In the manufacture of levulose, the rich nitrogenous substances may or may not be separated before the defecation of the juice.

Defecation

After the conversion step as set forth above, and either without or with separation of the nitrogenous coagulate or precipitate, the juice is then desirably subjected to a defecation operation. This is accomplished by means of an alkaline material such as the alkaline earths or other alkali substances. Lime is highly desirable in this connection. It may be added in the form of a suspension in water or as a fine powder either as quicklime or as hydrated lime. Such treatment results in neutralization and clarification. The defecating material such as a suspension of slaked lime in water (lime milk), may be added to the juice either while the latter is hot or after cooling to a lower temperature. The amount of lime required varies somewhat with the nature of the juice, but in general should be in sufficient quantity to impart a slight degree of alkalinity to the juice, say pH 7.0 to 9.0. The slime resulting from this or previous treatment may be removed by filtration alone or in combination with any of the usual thickening processes.

The juice thus obtained contains the levulose in solution, uncombined chemically with other substances, but admixed with all of the original impurities which were not removed by coagulation, defecation, and filtration. From such juice, a portion of the levulose may be obtained in crystalline form by evaporation to a high concentration, crystallization being carried out in some such manner as is described below. However, it is desirable to isolate the levulose from the impure solutions referred to, by causing it to form its well known combination with lime, such compound being relatively insoluble in water. Substantial freedom of this compound from impurities results by filtration and washing.

The combination of lime with levulose may be effected in a number of ways, and its form will vary in accordance with the method used. For example, lime and levulose are mixed simultaneously with rapid agitation, the compound is produced in the form of a creamy paste consisting of a vast number of minute needles which interlace and cause difficulty in the filtration operation. It is better to admit the lime and juice to the reaction vessel simultaneously in small, chemically equivalent fractions, each entering portion being diluted to the whole volume of the reaction mixture then present before undergoing reaction. A more granular precipitate is thus obtained.

Further and decided improvement results however, if the reacting materials instead of being added simultaneously are so added that the lime required for the reaction with the levulose is present in the mixture prior to the addition of the levulose to react therewith. In this way an excess of lime is maintained at all times, even during the gradual addition of the reacting substances to the reaction mixture. Further, it is desirable to use a slight excess of lime over and above the theoretical quantity required to react with the levulose since a portion of the lime is held in solution by sugars other than levulose, a portion remains inactive, and probably a portion of the lime is carried down by the precipitate without undergoing reaction. When calculated as CaO, the theoretical quantity of lime is 32.1% of the levulose with which it is to combine. However it is desirable to add from 35 to 60% of CaO in order that a sufficient quantity may be present to insure as nearly a quantitative precipitation of the levulose as possible. An insufficient amount of lime causes a loss of levulose. The solubility of lime levulate increases rapidly with increase of temperature, and consequently the temperature during the precipitation should be as low as possible, and desirably around the freezing point. The conditions of precipitation profoundly influence the crystalline structure of the lime levulate. Prior art methods resulted in a network of thin, interlacing needles, which were so fragile that under the pressures incidental to filtration, they shattered into fragments and impeded the filtration and separation of waste water. By the process set forth above, and under the preferred conditions specified, isolated crystals of much larger dimension are produced, taking the form under the microscope of thickened, heavy rods. Such heavy rod-like crystals produced by the present process are much less fragile and retain to a great degree their form, and thus greatly simplify and facilitate the flow of waste and wash water.

The lime levulate thus prepared is separated from the waste water by any desirable method of filtration, the temperature being desirably kept as low as possible at all times, both during the filtration and washing steps subsequently used.

The filter cake is then suspended in water or in a sirup of levulose and decomposed. Carbonic acid gas is a highly desirable agent for this purpose although other acids may be used, particularly those that give an insoluble calcium salt. The carbon dioxide causes a precipitation of calcium carbonate and releases the levulose to the aqueous solution. The calcium carbonate is removed by any desirable process of filtration and washing.

The thin juice remaining contains levulose in a high state of purity. It should be slightly acid from the necessary excess of carbonic acid, which also has the effect of dissolving some of the calcium carbonate to form calcium bicarbonate. This bicarbonate should be removed; but such removal may be accomplished in various ways. For example the juice may be treated in a vacuum evaporator to remove the carbon dioxide together with water vapor, whereby the calcium carbonate formed is precipitated and may be removed by filtration. The juice however then becomes somewhat alkaline represented by a pH value of from 8.5 to 9.5. This alkalinity is best reduced immediately after filtration since it has an injurious effect on the levulose. To this end any acid in small quantity may be added, hydrochloric acid serving well for this purpose, as well as sulphur dioxide, the acidity produced being desirably pH of 6.0 to 7.0.

Instead of removing the bicarbonate in the manner indicated, the following method may be used. Since it is known that due to hydrolysis, calcium carbonate imparts a slight degree of alkalinity, by adding a small quantity of milk of lime or a suspension of lime levulate in water until the solution shows a reaction of from pH equal to 8.5 to 9.5, the solution will be substantially free from calcium bicarbonate. The calcium carbonate is filtered off and the solution is then acidified as above to pH 6.0 to 7.0 with any convenient acid such as hydrochloric acid or sulphur dioxide. In applying this second method of removal of the calcium bicarbonate, the entire procedure is desirably but not necessarily carried out at the very cold temperature of the precipitation, and may be applied to the solution either before or after the removal of the carbonate formed during the carbonation of the levulate cake. The thin levulose liquor is then evaporated in the usual vacuum evaporators to such a concentration that the levulose may be crystallized.

Crystallization

Previous methods for the crystallization of levulose have necessitated the use of non-aqueous solvents such as alcohol or acetic acid. These materials are so expensive that the necessity of using them has precluded the possibility of industrial production of levulose. However it has been found that contrary to such prior art practice, levulose may be induced to crystallize from aqueous sirups so that expensive non-aqueous solvents may be eliminated. It has further been discovered that the saturated solutions of levulose are sufficiently fluid as to be readily separated from the crystals by modern centrifugal machines. The solubilities of levulose at certain temperatures is given below:

| Centigrade | Per cent |
|---|---|
| 20.0° | 78.94 |
| 25.0 | 80.29 |
| 30.0 | 81.64 |
| 35.0 | 82.98 |
| 40.0 | 84.34 |
| 45.0 | 85.64 |
| 50.0 | 86.90 |
| 55.0 | 88.10 |
| 60.0 | 89.23 |

In carrying out the crystallization processes, the purified sirups are evaporated in vacuum evaporators of the usual type and at as low a temperature as possible until the sirup reaches a concentration of from 87 to 93% solids. The thick juice is then transferred to a crystallizer and its temperature adjusted so that at the temperature the liquor is slightly supersaturated with levulose. It has been found to be satisfactory and convenient to start crystallization at temperatures varying from 50° C. to 65° C., but other temperatures may be used, depending merely on the choice of such concentrations and temperatures that the juice during the process of crystallization is slightly supersaturated with levulose.

Seeding

The formation of crystals is induced in one of several ways of which the following are exemplary. In one method, a considerable quantity of previously formed levulose crystals are added to the thick juice. These may be added in such quantity that there is present a sufficient number of crystalline nuclei upon which subsequent crystallization may develop without the formation of new nuclei. In this method the concentration and temperature are such that the levulose is present in but slight supersaturation say from 5 to 10 percent. In another method, the supersaturation may be adjusted to a higher degree and a relatively small number of previously formed crystals be added. Under these conditions, the higher degree of supersaturation causes the formation of new nuclei in sufficient numbers so that subsequent crystallization causes these nuclei to grow continually as the temperature of the juice is permitted to drop. In a third method, seed crystals may be added to the evaporator after the concentration of the juice reaches the saturation point of the levulose. The correct number of crystalline nuclei to be used cannot be stated in quantitative terms, but easily determined by those skilled in the art.

Then having started the process of crystallization with the correct number of crystalline nuclei, the levulose is caused to deposit from the solution upon the nuclei by maintaining the supersaturation of the sirup. This may be done for example by permitting the temperature to drop systematically. The rate of drop depends to a large extent upon the purity of the sirup. If crystallization is proceeding from very pure sirups, say of 93% purity or above, the rate of drop may be relatively rapid, say one degree centigrade per hour; but the rate of drop may vary dependent also on the size of grain that is to be produced.

In crystallizing from sirups of lower purity, the rate of temperature drop will generally be considerably slower. In some instances it may require several days or a week or more to complete the crystallization. The crystallization is considered to be complete when the deposition of levulose has proceeded to a point where the resulting masse-cuite is stiff but yet capable of gradual flow. In general this state is reached when the temperature of the masse-cuite has dropped to about 30° C. but may be at any point between 20 and 40° C., always depending upon the principles set forth above.

The mother liquor having lost somewhat more than one-half of its levulose, has a considerably lowered purity. But it is possible to further crystallize levulose from it. For this purpose, the liquor after filtration, is evaporated to 89 to 93% solids and again seeded. But in this case, the rate of crystallization depending on the temperature drop should be reduced since the rate of crystallization from such solutions is considerably diminished by the presence of the accumulated impurities. Alternatively, the crystallization may be allowed to proceed in the vacuum pan, but evaporation must be so slow as not to produce too high a degree of supersaturation at any time during the progress of the crystallization.

As stated above the crystallization proceeds relatively the more slowly, the greater the accumulation of impurities in the sirup. By permitting the temperature of the crystallizer to drop too rapidly the sirup is unable to maintain itself in a state of exact saturation or of but slight supersaturation, and accordingly the levulose will be deposited as minute crystals in large number, such crystals being so small that the subsequent purging of the masse-cuite becomes difficult or impossible. In order to remove this possibility, the rate at which the temperature is allowed to drop in the crystallizer or the rate of evaporation in the vacuum is so slow that this high degree of supersaturation is not reached. However, a third alternative may be adopted. In this case, the thick juice at a relatively low concentration, say 80 to 85% solids is introduced into a crystallizer of special design wherein it is maintained at substantially the same temperature during the entire process of crystallization. This crystallizer may be so constructed that it may maintain a partial vacuum but permit the passage of a small stream of air or other gas over the surface. In some instances the vacuum may be unnecessary, as a stream of warm air may suffice. The thick juice is then seeded and while in constant but slow agitation, the residual moisture may be evaporated as rapidly as the juice by slow deposit of levulose can accommodate itself to the approximate saturation point at the temperature of the crystallizer, the heat necessary for evaporation being supplied in any suitable manner. The advantage of this method lies in the fact that it lends itself to very exact control inasmuch as the concentration of the mother liquor may readily be determined at any point and the evaporation made slower or more rapid as occasion demands. This method is the more applicable, the greater the accumulation of impurities. It is not essential that the temperature be kept constant. It may be varied at will by either dropping it or on occasion even raising it according to the judgment of the operator.

In order to illustrate a method of crystallization more succinctly the following illustrative example is given, it being understood that no limitation thereby is intended. Starting with a sirup ascertained by analysis to contain 90.35% of solids of which 95% is levulose (the sirup thus having a levulose purity of 95%), from the table of solubilities of levulose in water, it is found that such a sirup will be 10% supersaturated at 59° C., for it has been determined that a saturated solution of pure levulose contains 809 grams of levulose in 100 grams of water at 59° C., while the sirup referred to above contains 890 grams of levulose in 100 grams of water. The temperature of the sirup in the crystallizer is accordingly adjusted to 59° C. and seed crystals added. For example, using the second method outlined above under crystallization, crystals of the proper type free from the needle-like form are selected, and may be sieved so that particles which pass for example a sieve having 35 meshes to the inch are obtained. This is exemplary only, as other sizes may be utilized. 25 grams of these fine crystals may now be added for each kilogram of thick juice. The temperature of the crystallizer is then allowed to drop fairly rapidly, say one or two degrees per hour, for a period of from two to three hours until enough new crystals have formed to satisfy the judgment of the operator. Instead of adding dry crystals, there may be added a portion of a previously prepared masse-cuite, which contains a large number of well-formed crystals in suspension.

After the seed crystals have caused the crystallization to start in the proper manner, the temperature of the crystallizer is permitted to drop as rapidly as in the judgment of the operator will permit the deposition of levulose until a consistency of the masse-cuite has been reached from which it is inadvisable to permit more levulose to separate. Such a masse-cuite is as stiff as will readily flow under the action of the centrifugal force of the machines. The mixture is then centrifuged and the crystals washed. While water may be used for washing, the high solubility of the sugar makes this inadvisable because of resultant loss in the wash. It is more desirable to use a pure levulose sirup, either saturated, supersaturated, or undersaturated. This sirup may be derived from various sources. It may be a solution of pure levulose which is not of sufficiently high grade to be of the highest quality, or it may be a sirup from the evaporators which would otherwise be used for crystallization of levulose, or it may be the levulose obtained from the crystallization of sirups of low purity corresponding to the "raw sugar" of other industries. A washing sirup in amount of about 6 to 12% of the masse-cuite which is centrifuged, may be used.

The sirup which runs off of the masse-cuite has a purity lowered to from 80 to 85% because of the loss of levulose through crystallization. The wash which runs off after the application of the washing sirup has a purity of say 92 to 94%. The 80 to 85% purity, run-off sirup may be again evaporated and crystallized by substantially the same procedure except that greater caution must be used in lowering the temperature in order to avoid the deposition of small grain and particularly the needle-like crystals which are fatal to successful centrifugal separation.

Form of crystals

All previous preparations of levulose have been prepared by the use of non-aqueous solvents. The use of such materials causes the levulose to take the crystalline form of elongated needles. Such crystals are in almost every instance minute and fragile, and prone to interlace and mat into relatively impervious masses that render the masse-cuite containing them almost impossible of centrifugal purging. On the other hand levulose produced under the conditions aforesaid, and specifically described herein, are in the form of slightly tilted cubes or solid bodies whose three dimensions are of somewhat the same magnitude, and whose appearance is markedly distinguished from the needle like form. In view of the fact that these crystals are in the form of slightly tilted cubes, these crystals may be said to be of cuboid form. It is this fact that makes for the commercial feasibility of the present process and products since the levulose of the crystalline form produced by the processes set forth herein, lends itself to purification in ordinary centrifugal machines available in this art. Further the product is a granular, free-pouring, attractive appearing substance. While the needle like crystals are apparently very hygroscopic, the granular product is stable in ordinary atmosphere, and becomes hygroscopic in a very humid atmosphere only. The production of such granular products is to a large measure dependent on the choice of seed crystals that are substantially free from the needle-like variety, and on the operating conditions set forth above.

The general method of procedure outlined above is well illustrated in the diagram in connection with the preparation of levulose from artichokes, as shown beginning with the upper left hand portion of that diagram. This diagram shows the preferred sequence of steps that may be utilized.

In dealing with a substance like beet molasses, however many of these steps are unnecessary. The discard molasses from the beet sugar manufacture in the United States contains both sucrose and raffinose. By inversion levulose is produced, and since hydrolysis converts both sucrose and raffinose into levulose, there is no danger of the retention of raffinose in the subsequent precipitation with lime. Accordingly, the beet molasses may be given an inversion treatment, followed by filtration. The filtered liquor then passes to the lime precipitation step and may then follow substantially the same series of treatments as are accorded to the corresponding liquor derived from artichokes, as shown at the right hand side of the diagram.

Since dahlias contain a large amount of inulin, the treatment may follow that shown at the center of the upper part of the flow sheet. After extraction of the juice in any desirable way, it is defecated and filtered. Such treatment relies on the fact that the levulose source present in dahlias is largely in the form of inulin which is of low solubility in cold water. A considerable portion of the levulose may therefore be obtained in the form of inulin before conversion. The extracted juices from the dahlia may be simply prepared for the separation of inulin. A simple filtration with kieselguhr for example at about 80 to 90° C. yields a juice from which very nearly white inulin may be crystallized. The filtrate from the inulin recovery is then converted and follows the sequence of steps indicated above for the treatment of juice from artichokes. Owing to the variability in composition of dahlia juices, it is impossible to specify the densities and temperatures that will yield the purest inulin. In general the juices should be well diluted. They may then be heated to 90 to 100° C., treated with kieselguhr, filtered, and allowed to cool. In the neighborhood of 20 to 30° C. inulin appears as a finely divided precipitate, which behaving like a crystalline substance, becomes granular if allowed to form slowly and with a gentle agitation. In most instances, it is advantageous to cool to 0 to 10° C. in order to complete the inulin separation. As thus obtained, the inulin is sufficiently granular to filter readily, and may be washed with cold water; considerable washing is desirable in order to remove any levulins that may be present. The wash water may be used for maceration during subsequent extractions of tubers. The more completely the inulin is freed from levulins, the higher is the purity of the converted liquor.

The conversion of inulin into levulose is readily accomplished by heating with dilute acids. The inulin may be treated in the form of a paste with dilute hydrochloric or sulphuric acid.

By-products of ultimate value may also be recovered. The exhausted pulp from the artichoke may be utilized as a cattle food. The dahlia fiber may find adaptability in the manufacture of fiber-board. If desiccated it may be used as fuel. While the filtrates from the lime precipitation occupy a considerable volume, they may be utilized in fermentation processes. The vinasses may be utilized in the same manner as other vinasses.

The only reagent required in large quantity is lime. It may be recovered by burning the carbonate formed in the process.

Having thus set forth my invention, I claim:

1. The process which comprises crystallizing levulose from aqueous levulose sirups containing from 87 to 93% solids.

2. The process which comprises crystallizing levulose in granular form from aqueous sirups of high levulose content.

3. The process which comprises preparing an aqueous levulose sirup of high levulose content, seeding such sirup with cuboid crystalline levulose, and separating cuboid crystalline levulose therefrom.

4. The process which comprises crystallizing levulose in granular form from aqueous sirups of high levulose content, and centrifuging to separate the crystallized levulose.

5. The process which comprises crystallizing levulose from aqueous levulose sirups containing from 87 to 93% solids, and centrifuging to separate the crystallized levulose.

RICHARD F. JACKSON.